(12) United States Patent
Zhang et al.

(10) Patent No.: US 7,839,842 B2
(45) Date of Patent: Nov. 23, 2010

(54) METHOD AND SYSTEM FOR A RANGE REDUCTION SCHEME FOR USER SELECTION IN A MULTIUSER MIMO DOWNLINK TRANSMISSION

(75) Inventors: Chengjin Zhang, La Jolla, CA (US); Jun Zheng, La Jolla, CA (US); Vinko Erceg, Cardiff, CA (US); Severine Catreux-Erceg, Cardiff, CA (US); Pieter Roux, San Diego, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 368 days.

(21) Appl. No.: 11/231,699

(22) Filed: Sep. 21, 2005

(65) Prior Publication Data

US 2007/0066230 A1    Mar. 22, 2007

(51) Int. Cl.
*H04W 4/00* (2009.01)
*H04L 12/50* (2006.01)

(52) U.S. Cl. ............ 370/380; 370/329; 370/332; 370/333; 370/208

(58) Field of Classification Search .......... 370/395.4, 370/349, 352, 394, 380, 329, 332, 333, 208
See application file for complete search history.

(56) References Cited

U.S. PATENT DOCUMENTS

| | | | | |
|---|---|---|---|---|
| 6,052,596 | A * | 4/2000 | Barnickel | 455/450 |
| 6,131,031 | A * | 10/2000 | Lober et al. | 455/444 |
| 7,194,041 | B2 * | 3/2007 | Kadous | 375/267 |
| 2003/0223429 | A1 * | 12/2003 | Bi et al. | 370/395.4 |
| 2004/0190485 | A1 * | 9/2004 | Khan | 370/349 |
| 2004/0208183 | A1 * | 10/2004 | Balachandran et al. | 370/395.21 |
| 2005/0013352 | A1 * | 1/2005 | Hottinen | 375/219 |
| 2005/0078665 | A1 * | 4/2005 | Yu et al. | 370/380 |
| 2005/0088959 | A1 * | 4/2005 | Kadous | 370/208 |
| 2005/0181739 | A1 * | 8/2005 | Krasny et al. | 455/69 |
| 2005/0265223 | A1 * | 12/2005 | Song | 370/208 |

(Continued)

OTHER PUBLICATIONS

E. Telatar, "Capacity of multi-antenna gaussian channels," Bell Labs Technical Journal, Jun. 1995.

(Continued)

*Primary Examiner*—Huy Phan
*Assistant Examiner*—Julio Perez
(74) *Attorney, Agent, or Firm*—McAndrews, Held & Malloy, Ltd.

(57) ABSTRACT

Various aspects of a method and a system for a range reduction scheme for user selection in a multiuser MIMO downlink transmission are presented. Aspects of a system for range reduction may comprise a range reduction processor that determines a plurality of channel measurements corresponding to a plurality of signals. The range reduction processor may compute a plurality of channel capacities based on the channel measurements corresponding to a subset of the plurality of signals having channel gain that is greater than a remaining portion of the plurality of signals. Aspects of a method may comprise determining a plurality of channel measurements corresponding to a plurality of signals, and computing a plurality of channel capacities based on said channel measurements corresponding to a subset of the plurality of signals having a channel gain that is greater than a remaining portion of the plurality of signals.

21 Claims, 7 Drawing Sheets

U.S. PATENT DOCUMENTS

| | | | |
|---|---|---|---|
| 2006/0115014 A1* | 6/2006 | Jeong et al. | 375/267 |
| 2006/0153216 A1* | 7/2006 | Hosein et al. | 370/412 |
| 2006/0252445 A1* | 11/2006 | Kim et al. | 455/522 |
| 2008/0192683 A1* | 8/2008 | Han et al. | 370/329 |

OTHER PUBLICATIONS

G. J. Foschini, "Layered space-time architecture for wireless communication in a fading environment when using multiple antennas," Bell Labs Technical Journal, vol. 1, No. 2, pp. 41-59, 1996.

S. Caire, G. Shamai, "On the achievable throughput of a multiantenna gaussian broadcast channel," IEEE Trans. on Information Theory, vol. 49, No. 7, pp. 1691-1706, 2003.

C. B. Peel, B. M. Hochwald, and A. L. Swindlehurst, "A vector-perturbation technique for near-capacity multiantenna multiuser communication—Part I: channel inversion and regularization," IEEE Trans. on Communications, vol. 53, No. 1. pp. 195-202, Jan. 2005.

C. Windpassinger, R. F. H. Fischer, T. Vencel, and J. B. Huber, "Precoding in multiantenna and multiuser communications." IEEE Trans. on Wireless Communications, vol. 3, No. 4, pp. 1305-1316, 2004.

B. M. Hochwald, C. B. Peel, and A. L. Swindlehurst, "A vector-perturbation technique for near-capacity multiantenna multiuser communication—Part II: perturbation," IEEE Trans. on Communications, vol. 53, No. 3, pp. 537-544, Mar. 2005.

T. Yoo and A. J. Goldsmith, "Optimality of zero-forcing beamforming with multiuser diversity," in 2005 IEEE International Conference on Communications, Seoul, Korea, May 2005, pp. 542-546.

* cited by examiner

METHOD AND SYSTEM FOR A RANGE REDUCTION SCHEME FOR USER SELECTION IN A MULTIUSER MIMO DOWNLINK TRANSMISSION

CROSS-REFERENCE TO RELATED APPLICATIONS/INCORPORATION BY REFERENCE

This application makes reference to:

U.S. application Ser. No. 11/232,340 filed Sep. 21, 2005;

U.S. application Ser. No. 11/232,266 filed Sep. 21, 2005;

U.S. application Ser. No. 11/231,501 filed Sep. 21, 2005;

U.S. application Ser. No. 11/231,586 filed Sep. 21, 2005;

U.S. application Ser. No. 11/232,369 filed Sep. 21, 2005;

U.S. application Ser. No. 11/231,701 filed Sep. 21, 2005;

U.S. application Ser. No. 11/232,362 filed Sep. 21, 2005;

U.S. application Ser. No. 11/231,557 filed Sep. 21, 2005; and

U.S. application Ser. No. 11/231,416 filed Sep. 21, 2005.

Each of the above stated applications is hereby incorporated by reference in its entirety.

FIELD OF THE INVENTION

Certain embodiments of the invention relate to processing of signals in communications systems. More specifically, certain embodiments of the invention relate to a method and system for a range reduction scheme for user selection in a multiuser multiple-input-multiple-output (MIMO) downlink transmission.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. However, the use of multi-antenna techniques for a multiuser environment to improve total throughput remains a challenge.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a range reduction scheme for user selection in a multiuser multiple-input-multiple-output (MIMO) downlink transmission, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for a range reduction scheme for user selection in a multiuser multiple-input-multiple-output (MIMO) downlink transmission. Various embodiments of the invention may reduce the computational complexity, at a base station comprising multiple antennas, associated with selecting a subset of mobile terminals which are to simultaneously receive a signal from the base station. The mobile terminals in the subset may be selected to maximize the capacity of information that is transmitted from the base station during a given time interval. Those signals in the subset may be referred to as being in the reduced range.

Communication systems using multiple antennas at both the transmitter and the receiver have received increased attention due to their promise of providing significant capacity increases in a wireless fading environment. However, many of the pioneering approaches to multiple antenna systems have been restricted to single user point-to-point links. Recently, attention has been focused on improvements in total throughput that may be realized by utilizing multi-antenna techniques in a multiuser environment. A communication from a base station to a mobile terminal, or user, may be referred to as a downlink communication. With multiple antennas installed, the base station may select a group of the users (active users) to transmit their respective data streams simultaneously. The information transfer rate that may be achieved in a downlink communication between the base station in a multiuser environment, comprising a plurality of users, may be equal to a sum of the downlink information transfer rates of the active users. The maximum sum of the downlink transfer rates may be referred to as the sum capacity associated with a plurality of users. A communication from a user to a base station may be referred to as an uplink communication.

In a multiuser communication system, employing multiple antennas at the base station may improve the downlink system capacity. The capacity improvement may be attained by communicating simultaneously with multiple users by utilizing precoding at the transmitter when channel state information is available (CSI). A zero-forcing (ZF) linear precoder may achieve a sum capacity when the number of users, K, approaches infinity. The sum capacity may be based on the number of transmitting antennas that are located at the base station. Furthermore, ZF precoders may provide near-optimal performance even with a limited number of users, for example when K=10. Therefore, preceding combined with user selection in a multiuser environment may represent a promising technique that may be utilized in broadband wireless data communication systems.

Figure 1:
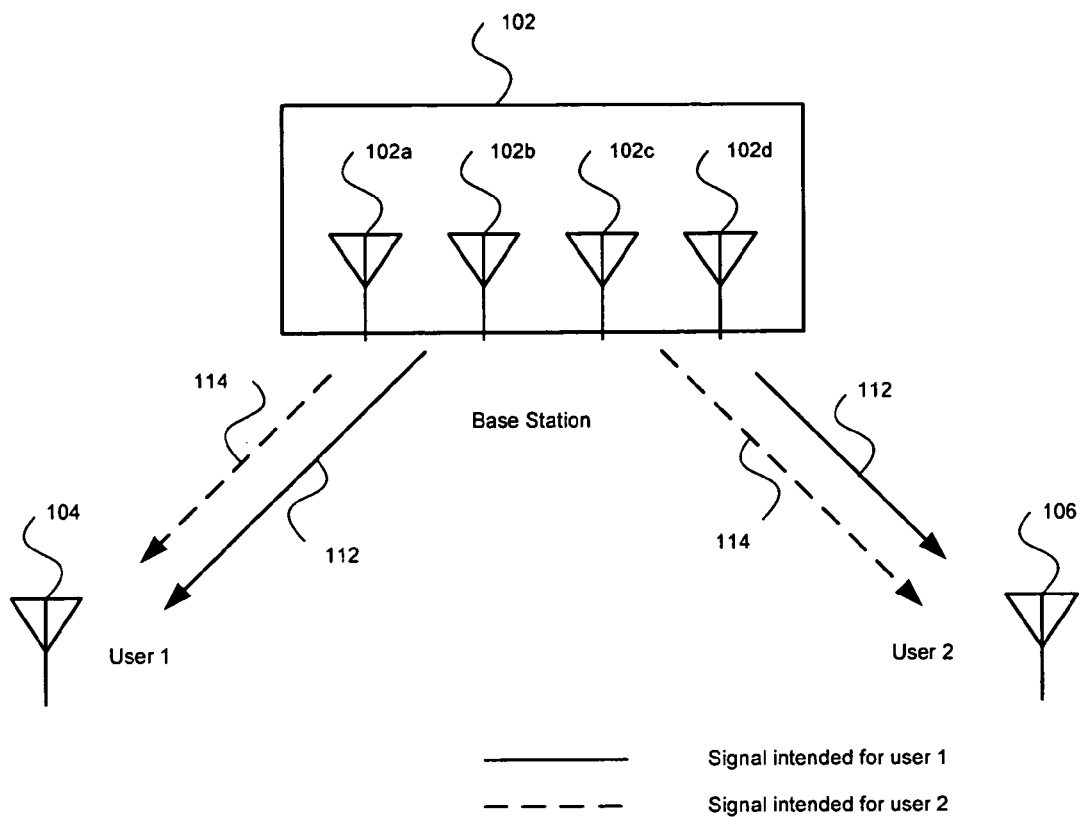
FIG. 1 is a block diagram illustrating an exemplary multiuser base station in a multiuser environment, which may be utilized in connection with an embodiment of the invention.

FIG. 1 is a block diagram illustrating an exemplary multiuser base station in a multiuser environment, which may be utilized in connection with an embodiment of the invention. Referring to FIG. 1, there is shown a base station 102, a first user 104, a second user 106, a signal 112 and a signal 114. The base station 902 may comprise a plurality of antennas 102$a$, 102$b$, 102$c$, and 102$d$. The base station 102 may utilize antennas 102$a$-102$d$ to transmit a signal 112. At the same time, the base station 102 may utilize antennas 102$a$-102$d$ to transmit a signal 114. The signal 112 may comprise information that is intended to be transmitted from the base station 102 to the first user 104. The signal 114 may comprise information that is intended to be transmitted from the base station 102 to the second user 106. The transmitted signals 112 and 114 may be received by the first user 104, and by the second user 106. At the first user 104, the signal 114 may represent an interference signal. At the second user 106, the signal 112 may represent an interference signal. The interference signal may be reduced by utilizing beamforming at the base station 102.

Figure 2:
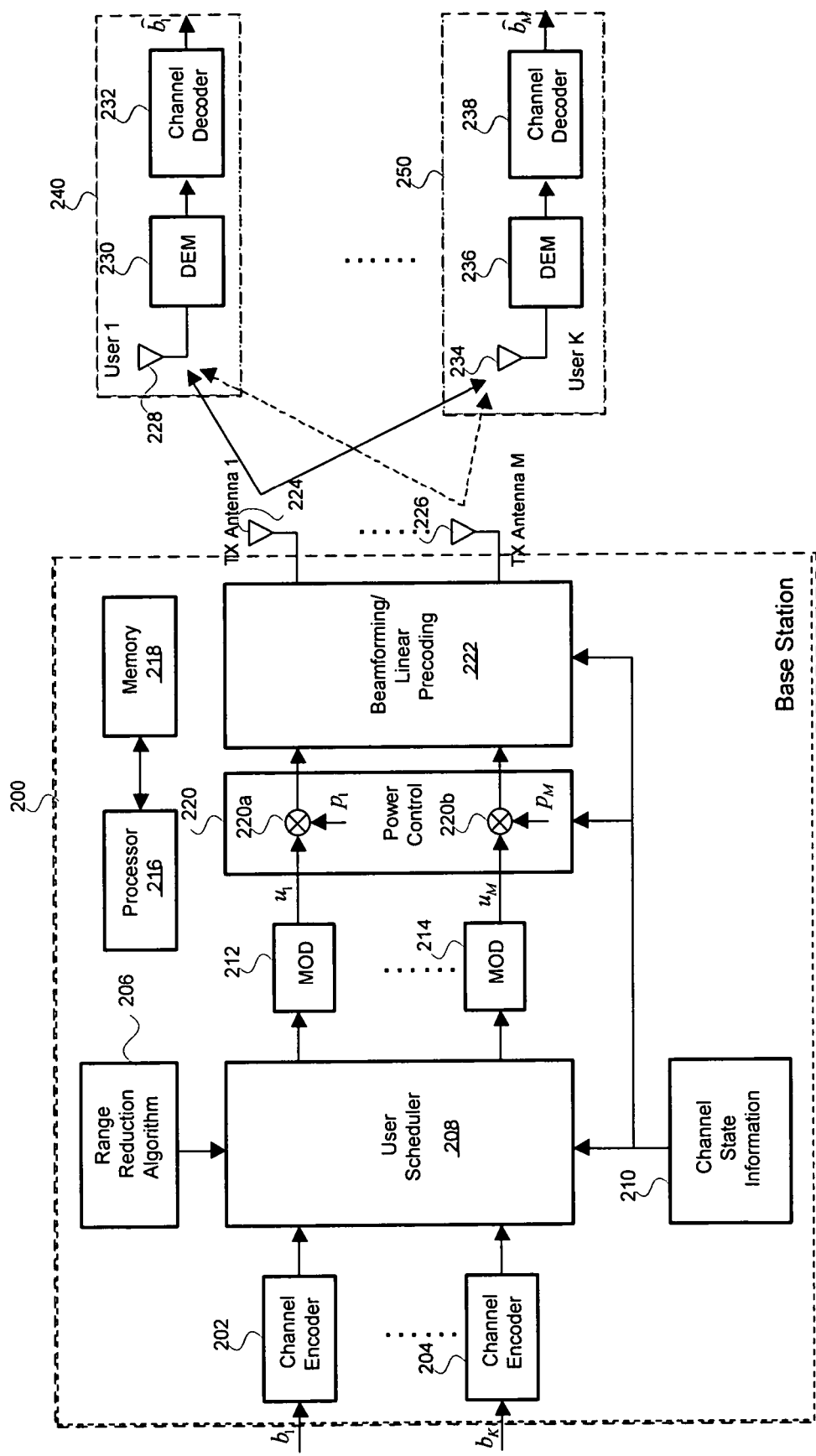
FIG. 2 is a block diagram illustrating an exemplary MIMO base station utilizing range reduction, in accordance with an embodiment of the invention.

FIG. 2 is a block diagram illustrating an exemplary MIMO base station utilizing range reduction, in accordance with an embodiment of the invention. Referring to FIG. 2, there is shown a base station 200 and a plurality of users 240 . . . 250. The base station 200 may comprise a plurality of channel encoders 202 . . . 204, a range reduction block 206, a user scheduler 208, a channel station information block 210, a plurality of modulators 212 . . . 214, a processor 216, system memory 218, a power control block 220, a beamforming or linear preceding block 222, a plurality of antennas 224 . . . 226. The power control block may comprise a plurality of multipliers 220$a$ . . . 220$b$. The user 240 may comprise an antenna 228, a demodulator 230, and a channel decoder 232. The user 250 may comprise an antenna 234, a demodulator 236, and a channel decoder 238.

The channel encoders 202 . . . 204 may comprise suitable logic, circuitry, and/or code that may be adapted to encode binary data associated with as many as K individual information streams. The range reduction block 206 may comprise suitable logic, circuitry, and/or code that may be adapted to selecting a subset comprising L users from a larger set of K users. For example, the range reduction block 206 may select 10 users, L=10, from a larger group of 100, K=100, users. The 10 users may comprise the reduced range. The user scheduler 208 may comprise suitable logic, circuitry, and/or code that may be adapted to select a group of M or less than M users that are to receive one of M or less than M signals simultaneously transmitted via an antenna 224 . . . 226. The selected users may be from a set of L users as selected by the range reduction block 206. For example, the user scheduler 208 may select a group of 2 users, M=2, for a subset of 10, L=10 users. The group of 2 users may be selected based on a criterion that maximizes the instantaneous rate of information transfer from the base station 200. The channel state information (CSI) block 210 may comprise suitable logic, circuitry, and/or code that may be adapted to provide channel state information of a plurality of users 240 . . . 250. The channel state information of a plurality of users 240 . . . 250 may be obtained by uplink channel estimation in a time division duplex (TDD) system or by CSI feedback received from the users through a dedicated feedback link in a frequency division duplex (FDD) system.

The modulators 212 . . . 214 may comprise suitable logic, circuitry, and/or code that may be adapted to modulate the binary data of each of the users selected by the user scheduler 208. In this regard, the modulation operation on the binary data may result in a plurality of complex symbols $u_1 \ldots u_M$, for example. The power control block 220 may comprise suitable logic, circuitry, and/or code that may be adapted to allocate different power levels, $p_1 \ldots p_M$, to complex symbols $u_1 \ldots u_M$ received from the modulation blocks 212 . . . 214, for example. The power level associated with each of the signals received from a modulator 212 . . . 214 $u_1 \ldots u_M$ may be scaled by a multiplier block 220a . . . 220b. The scaling may produce a plurality of power level adjusted user data symbols $p_1 u_1 \ldots p_M u_M$. Each of the power level adjusted user data symbols $p_i u_i$, where i is an integer whose value is between 1 and M inclusive, may be referred to as a spatial stream.

The beamforming or linear precoding block 222 may comprise suitable logic, circuitry, and/or code that may be adapted to process spatial streams and to separate signals intended for different users such that each of the users 240 receives little or no interference from signals intended for other users 250. With M antennas at the base station 200, the beamforming or linear precoding block 222 may separate up to M different signals, which the base station 200 may transmit simultaneously via the antennas 224 . . . 226. The signal transmitted via antenna 224 may comprise signal contributions from the plurality of spatial streams. For example, the signal transmitted via antenna 224, $x_1$, may be represented as $x_1 = a_1 p_1 u_1 + \ldots + m_1 p_M u_M$. The constants $a_1$ and $m_1$ represent weighting factors utilized by the beamforming or linear precoding block 222 when forming the signal transmitted by the antenna 224. The signal transmitted via antenna 226, $x_M$, may be represented as $x_M = a_M p_1 u_1 + \ldots + m_M p_M u_M$, for example. The constants $a_M$ and $m_M$ represent weighting factors utilized by the beamforming or linear preceding block 222 when forming the signal transmitted by the antenna 226. The beamforming or linear preceding block may be referred to as a precoder.

The processor 216 may comprise suitable logic, circuitry, and/or code that may be adapted to process information and/or data associated with the generation of transmission signals at the base station 200. The processor 216 may, for example, determine the values of parameters that control the operation of the range reduction block 206. For example, the processor 216 may determine a threshold value that is utilized by the range reduction block 206 to select users 240 . . . 250 to be included in a user group. The memory 218 may comprise suitable logic, circuitry, and/or code that may be utilized to store data and/or control information that may be utilized in the operation of at least a portion of the base station 218. For example, the memory 218 may be utilized to store information that identifies users 240 . . . 250 that have been included in a user group.

The user scheduler 208, the power control block 220, and/or the beamforming or linear precoding block 222 may require knowledge of the state of the downlink channel. The CSI block 210 may be adapted to transfer the channel state information to the user scheduler 208, the power control block 220, and/or the beamforming or linear preceding block 222. This does not exclude other functional blocks within the base station 200, for example the range reduction algorithm block 206 and/or the processor 216, from utilizing channel state information.

The user 240 may receive at least a portion of the signals transmitted by the base station 200 via the antenna 228. The demodulator 230 may comprise suitable logic, circuitry, and/or code that may be adapted to demodulate the signals received from the base station 200, for example. The channel decoders 232 may comprise suitable logic, circuitry, and/or code that may be adapted to decode the demodulated signals from the demodulators 230 into binary bit streams, for example. The user 240 may receive at least a portion of the signals transmitted by the base station 200 via the antenna 234. The demodulator 236 may comprise suitable logic, circuitry, and/or code that may be adapted to demodulate the signals received from the base station 200, for example. The channel decoders 238 may comprise suitable logic, circuitry, and/or code that may be adapted to decode the demodulated signals from the demodulators 236 into binary bit streams, for example.

In operation, the base station 200 comprising M antennas 224 . . . 226, may transmit a signal to each of a plurality of M users 240 . . . 250 simultaneously. A selected plurality of M users 240 . . . 250 may represent a group of users, comprising a subset, selected from a plurality of K total users. The sum capacity associated with a first selected plurality of M users may be greater than the sum capacity associated with a second selected plurality of M users, for example. In this case, the first selected plurality of M users may be considered to be a better group in comparison to the second selected plurality of M users in terms of sum rate. When the total number of users K is large compared to the number M, the number of potential groups of users, or subsets, may be large. Each subset may comprise a unique combination of M users selected from the total number of K users. An optimal group may refer to a single M-user combination which provides the largest sum rate among all the possible combination of M users selected from the total number of K users. To find the optimal group of users to which the base station 200 may simultaneously transmit signals, the precoder 222 may search all potential subsets, among the total number of K users, to find the one with the largest instantaneous sum rate. The search range, in this case, may be K. The complexity of the search algorithm may increase dramatically with increasing values of K.

Various embodiments of the invention may comprise a range reduction block 206, which implements an algorithm that decides a reduced user range L within which the user scheduler 208 searches for the best user group. Specifically, the user scheduler 208 may only search among the L strongest users for the user combination that provides the largest sum rate. The criteria for evaluating the strength of any of the K users may utilize a signal gain measurement, wherein a first user 240 may be considered stronger than a second user 250 when the signal gain associated with the first user 240 is greater than the signal gain associated with the second user 250. The channel measurement and/or signal gain information may be based on information retrieved from the CSI block 210. The search among the L strongest users may reduce the search range from a value K to a value L. When the value L is much less than the value K, a significant reduction in the search range may be achieved in various embodiments of the invention. The reduction in the search range may similarly result in a significant reduction in the computational complexity associated with the user scheduler 208. Furthermore, in frequency division duplex (FDD) systems in which the base station may obtain the CSI from the users via a feedback link, the amount of feedback information received and/or processed at the base station may be significantly reduced because the base station may require full channel measurement information associated with only the plurality of L strongest users, instead of larger the plurality of K users. Various embodiments of the invention may comprise a method and a system for determining a value for the reduced range L.

At the base station 200, a plurality of signals $x_1 \ldots x_M$ may be transmitted by a corresponding plurality of antenna 224 ... 226. A corresponding plurality of signals $y_1 \ldots y_K$ may be received by each of a corresponding subset of K users. Each of the received signals $y_1 \ldots y_M$ may comprise a contribution from a plurality of transmitted signals $x_1 \ldots x_M$. For example, the signal received by a first user 240, $y_1$, may be represented $y_1 = h_{11}x_1 + \ldots + h_{1M}x_M$. The plurality of transmitted signals $x_1 \ldots x_M$ and received signals $y_1 \ldots y_M$ as shown in FIG. 2 may be expressed in a signal model utilizing matrix notation. The signal model may be specified using the following expression:

$$\begin{bmatrix} y_1 \\ y_2 \\ \vdots \\ y_k \end{bmatrix} = \begin{bmatrix} h_1 \\ h_2 \\ \vdots \\ h_k \end{bmatrix} x + n, \quad (1)$$

where $y_k$ (k=1, ..., K) may represent the received signal by user k, $h_k \in \mathbb{C}^{1 \times M}$ may represent the channel vector to user k, $x \in \mathbb{C}^{1 \times M}$ may represent the transmitted symbol vector by the base station, and $n \in \mathbb{C}^{k \times 1}$ may represent additive white Gaussian noise (AWGN). The AWGN may be characterized as comprising a zero mean value and unit variance. The transmitted symbols may satisfy a power constraint, $E[x^H x] \leq P$, where $(\bullet)^H$ may represent a complex conjugate transpose of the matrix $(\bullet)$.

Each element in $h_K$ may represent a zero-mean circularly symmetric complex Gaussian (ZMCSCG) random variable with unit variance. Signals received by each of the users 240 may experience independent fading, hence the plurality of channel vectors $$\{h_k\}_{k=1}^{K}$$

may each be statistically independent. The channel state information (CSI), $h_K$, may be assumed to be perfectly known to user k, but not to other users. In a time division duplex (TDD) system, the base station 200 can estimate CSI associated with an uplink channel and utilize the uplink CSI to estimate CSI associated with the corresponding downlink channel based on a channel reciprocity property between the uplink and downlink channels. Therefore, the base station 200 may compute channel knowledge about the CSI as observed by each of the users 240 through accurate channel estimation at the base station 200 derived from uplink CSI. In frequency division duplex (FDD) systems, the base station 200 may obtain CSI from the users via a rate constraint feedback link.

In multiuser communication systems, employing multiple antennas at the base station 200 may improve downlink system capacity. The capacity improvement may be attained by communicating simultaneously with multiple users 240 ... 250, utilizing precoding at the transmitter when channel state information (CSI) is available. Dirty paper coding (DPC) is a precoding scheme that may achieve a sum capacity, but the complexity of DPC may limit the ability to implement systems utilizing the precoding scheme. There may also exist other suboptimal, but relatively low complexity schemes for multiuser MIMO downlink transmission, such as linear precoding, Tomlinson-Harashima precoding (THP), and vector encoding, for example.

A zero-forcing (ZF) linear precoder may achieve the sum capacity when combined with infinite-order multiuser diversity when, for example, the number of users K approaches infinity. Furthermore, ZF precoders may provide near-optimal performance even when the number of users is not infinite, for example when K=10. One aspect of the invention may refer to the utilization of zero-forcing precoders in a multiuser environment. Various embodiments of the invention may not be limited to ZF precoders, however. Embodiments of the invention may also be applied to a plurality of precoding schemes that utilize multiuser diversity.

Zero-forcing precoders are a specific type of linear precoders. When the base station 200 selects a group of users to which a signal x may be transmitted, wherein the group of users may comprise $D \subseteq \{1, \ldots, K\}$ with $d = |D| \leq K$, a linear precoding scheme may linearly weigh the data symbols, $s = [s_1, \ldots, s_d]^T$, before they are transmitted from the base station according to the following expression:

$$x = FPs \quad (2)$$

where x may represent the transmitted signal vector as in (1), $F = [f_1, \ldots, f_d]$ may represent the M×d linear precoding matrix with normalized columns ($\|f_k\|=1$), and $P = \text{diag}\{P_1, \ldots, P_d\}$ with $$\sum_{i=1}^{d} P_i \leq P$$

may represent the power control matrix that allocates transmit power to different users. The data symbols s may correspond to the data symbols $u_1 \ldots u_M$ that are generated by the plurality of modulators 212 ... 214. The elements in the linear precoding matrix F may represent the plurality of weighing coefficients utilized by the precoder 222. The nonzero elements in the diagonal matrix P may represent the plurality of scaling factors $p_1 \ldots p_M$ utilized by the power control block 220. The plurality of received signals y may be represented as in the following expression:

$$\begin{bmatrix} y_1 \\ y_2 \\ \vdots \\ y_d \end{bmatrix} = \begin{bmatrix} h_1 \\ h_2 \\ \vdots \\ h_d \end{bmatrix} FPs + n. \quad (3)$$

A zero-forcing precoder 222, may utilize a pseudo-inverse of a channel matrix $$H_D = [h_1^T, \ldots, h_d^T]^T$$

as a weighting matrix when $H_D$ has full row rank, for example, when:

$$W_D = H_D^{\dagger} = H_D^H (H_D H_D^H)^{-1}, \quad (4)$$

$$F_D = W_D \begin{bmatrix} \frac{1}{w_1} & & \\ & \ddots & \\ & & \frac{1}{w_d} \end{bmatrix}, \quad (5)$$

where $$\{w_i\}_{i=1}^{d}$$

are the column of $W_D$

By defining:

$$\xi_i \triangleq \frac{1}{w_i} \quad (6)$$

and substituting (5) to (3), an equation representing the received signal may be obtained for each user when zero-forcing precoding is utilized as in the following expression:

$$y_i = \xi_i P_i s_i + n_i, \forall i \in D. \quad (7)$$

Thus, the multiuser downlink channel may be represented as a set of parallel channels. The maximum sum rate for a given user group D may be represented as in the following expression:

$$C_D = \sum_{i \in D} \log(1 + \xi_i P_i), \quad (8)$$

where the sum $C_D$ in (8) may represent a sum rate associated with a single group of M users 240 selected from a range of K users. The optimal value $P_i$ may be determined base on a water-filling solution as in the following expression:

$$P_i = \left(\mu - \frac{1}{\xi_i}\right)^+, \quad (9)$$

where the water level $\mu$ may be selected to satisfy the condition $$\sum_{i \in D} \left(\mu - \frac{1}{\xi_i}\right)^+ = P.$$

The maximum achievable sum rate for a given channel realization may thus be obtained by searching over all the possible user groups are represented as in the following expression:

$$C = \max_{D \subseteq \{1, \ldots, K\}, |D| \leq M} C_D. \quad (10)$$

where C in (10) may represent a maximum value of $C_D$ derived from a plurality of groups of M users selected from the reduced range of K users. A channel realization may comprise a selected set of channels, for example M, by which the base station 200 may simultaneously transmit information to selected users within a user group.

As shown in (10), for a given channel realization, the optimal brute-force user group selection for ZF preceding may require searching over all $$\sum_{i=1}^{M} \binom{K}{i}$$

possible user groups to find the one with the largest sum rate, which may lead to a high computational cost, when K is large.

However, it is not always necessary to search among all the K users to identify optimal user groups. Various embodiments of the invention utilize a reduced search block 206 that may reduce the search size from a value of K to a smaller value L by reducing the range of the search to comprise only the L users with the strongest channel gains. This may reduce the complexity of the search to $$\sum_{i=1}^{M} \binom{L}{i}.$$

When L<<K, the benefit in terms of reduction in computational complexity may be significant.

An example of a conventional approach to optimal group selection may be represented by a system with M=2 antennas 224, 226 at a base station 200 and K=100 users each equipped with a single antenna 228. For each channel realization $$\{h_k\}_{k=1}^{K},$$

the users may be sorted and indexed in terms of their channel gain as in the following expression:

$$\gamma_1 \geq \gamma_2 \geq \ldots \geq \gamma_K \quad (11)$$

where $$\gamma_k \triangleq \|h_k\|^2$$

may represent a value of signal gain, or channel gain, associated with signals transmitted by the base station 200 and received by a user k. In order to maximize the sum rate, the base station 200 may select an optimal user group according to (10).

Figure 3:
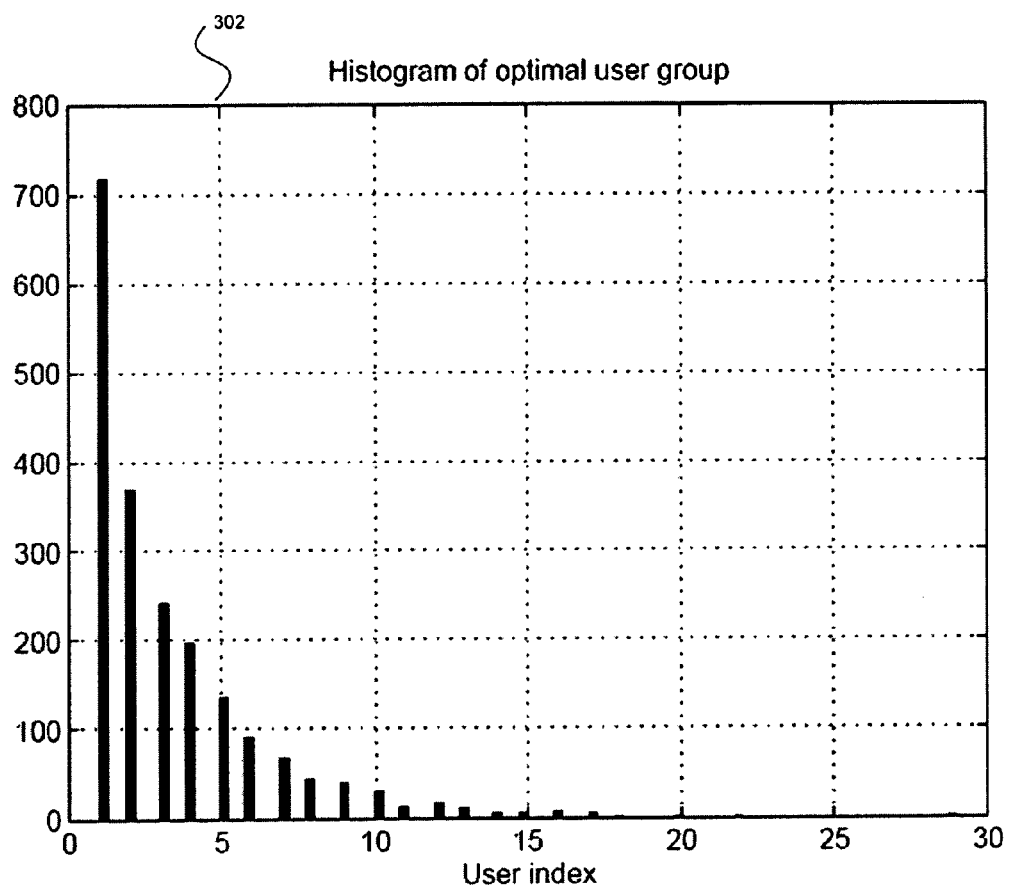
FIG. 3 is a histogram representation of indexes for optimal users compiled from 1000 random channel realizations, which may be utilized in connection with an embodiment of the invention.

FIG. 3 is a histogram representation of indexes for optimal users compiled from 1000 random channel realizations, which may be utilized in connection with an embodiment of the invention. Referring to FIG. 3, there is shown a histogram 302. The histogram 302 comprises a plurality of user indexes, k, and represents a number of instances in which the user, identified by the corresponding user index, may be selected in a channel realization. For example, the user indicated by user index=1 may be selected as an optimal user, for inclusion in a user group, in over 700 of the 1,000 channel realizations.

Figure 4:
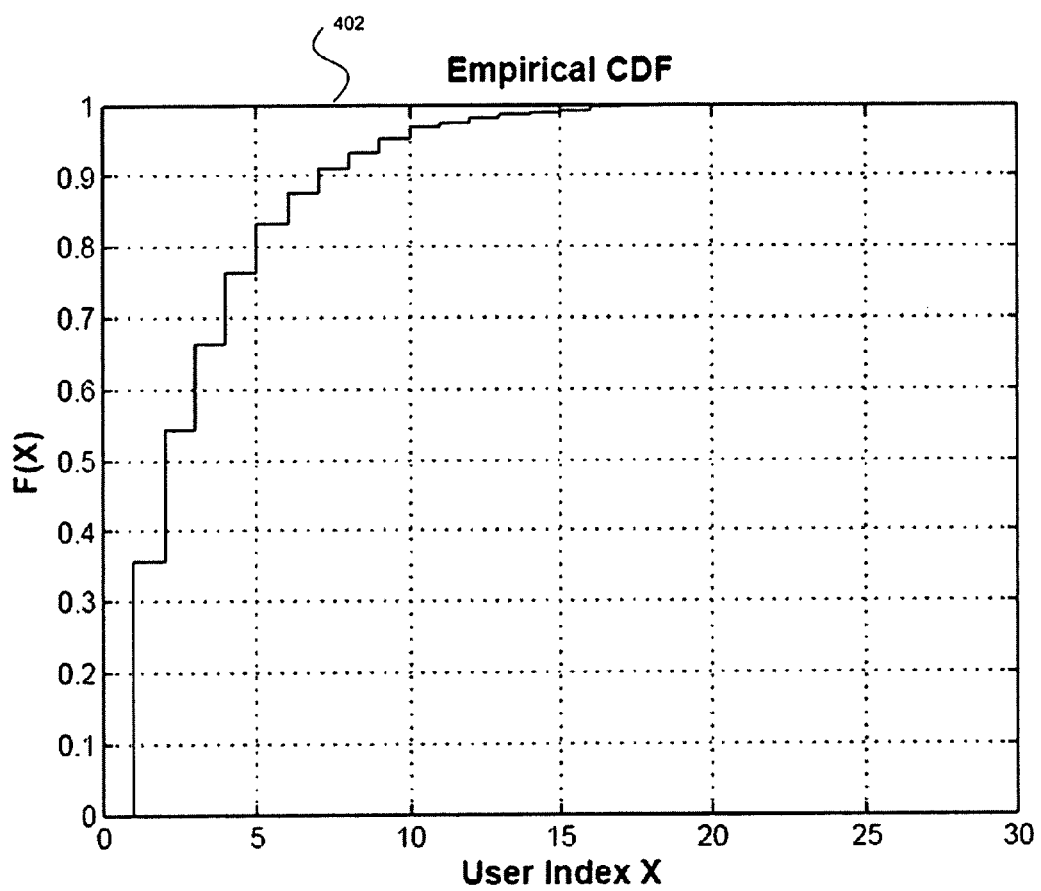
FIG. 4 is an empirical cumulative distribution function (CDF), which may be utilized in connection with an embodiment of the invention.

FIG. 4 is an empirical cumulative distribution function (CDF), which may be utilized in connection with an embodiment of the invention. Referring to FIG. 4, there is shown a cumulative distribution function (CDF) 402. The CDF comprises a plurality of user indexes, k, and represents the probability that the user, identified by the corresponding index k, and each of the preceding users, identified by preceding corresponding indexes to the index k, may be selected in a channel realization. For example, the first 10 users, indicated by user indexes that are less than or equal to 10, may be selected as optimal users in approximately 95% of channel realizations. The selected 10 users may represent the 10 strongest users.

One aspect of the invention may exploit the likelihood that a subset of the strongest users 240 may be included in a large percentage channel realizations. This realization may indicate that an optimum user group, associated with a maximum sum rate, may be determined, with a high degree of statistical likelihood, based on a reduced range search that includes only a subset of total users. By limiting the range of the search for the best user groups to only the L=10 strongest users, the number of possible combinations of user groups searched may be reduced from $$\sum_{i=1}^{M} \binom{K}{i} = 5050$$

to $$\sum_{i=1}^{M} \binom{L}{i} = 55,$$

corresponding to a complexity reduction of about 100, for example.

Figure 5:
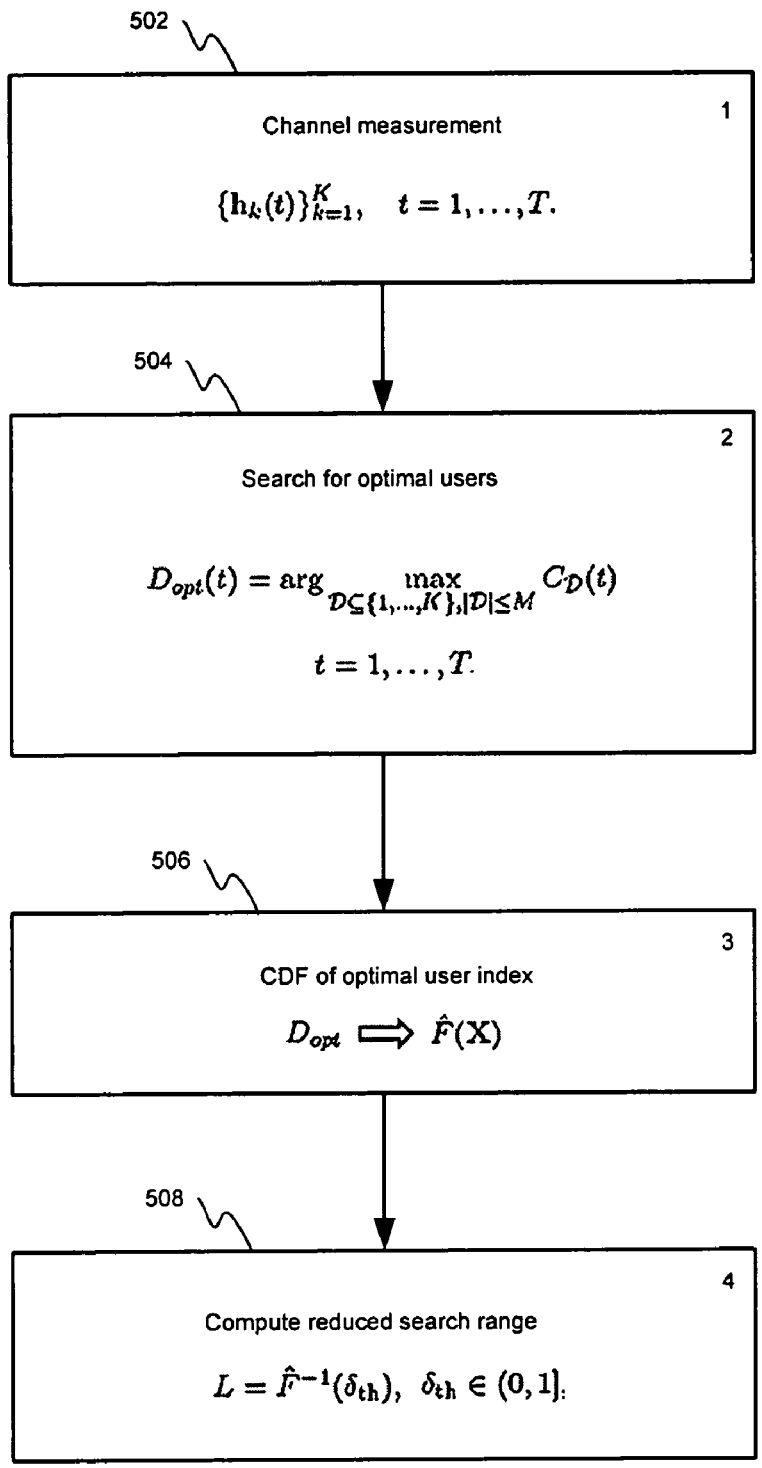
FIG. 5 is a flow chart that illustrates exemplary steps in a method for a range reduction scheme for user selection in a multiuser MIMO downlink transmission, in accordance with an embodiment of the invention.

FIG. 5 is a flow chart that illustrates exemplary steps in a method for a range reduction scheme for user selection in a multiuser MIMO downlink transmission, in accordance with an embodiment of the invention. Referring to FIG. 5, in step 502, channel state information (CSI) may be derived, step 504 comprise a search for optimal users, step 506 may comprise computing a cumulative distribution function (CDF) among user indexes, and step 508 may comprise computing a reduced search range.

In step 502 CSI may be derived based on a plurality of T independent channel realizations, for example:

$$\{h_\kappa(t)\}_{\kappa=1}^{K}, t=1, \ldots, T.$$  (12)

The CSI may comprise channel gain, or signal gain, information. For each channel realization, users among the full set of K users may be sorted, and indexed, in an order based on the values of the channel gains corresponding to each of the K users. For example, a user with a larger value of corresponding channel gain may be placed in the sorted list at a higher index than a user with a smaller value of corresponding channel gain as in the following expression:

$$\gamma_1(t) \geq \gamma_2(t) \geq \gamma_K(t), t=1, \ldots, T,$$  (13)

where $$\gamma_k(t) \triangleq \|h_k(t)\|^2.$$

The channel measurement may be carried out either by offline channel sounding or by online channel estimation. In a time division duplex (TDD) system, the base station may compute a channel estimate associated with an uplink channel, and use the uplink channel estimation as an approximation of channel estimates for the corresponding downlink channel based on a channel reciprocity property between the uplink and downlink channels. In a frequency division duplex (FDD) system, the reciprocity property may not be utilized. Thus, the downlink CSI may be estimated by the users 240 . . . 250 and subsequently communicated to the base station 200 via a dedicated feedback link.

In step 504, for each of the channel realizations according to (12), the optimal user group may be determined according to (8) and (10) as in the following expression:

$$D_{opt}(t) = \arg\max_{D \subseteq \{1, \ldots, K\}, |D| \leq M} C_D(t),$$  (14)

$$t = 1, \ldots, T,$$

where $$C_D(t) = \sum_{i \in D} \log(1 + \xi_i(t) P_i(t)),$$  (15)

and where $\xi_i(t)$ and $P_i(t)$ may be as defined in (6) and (9), respectively. $D_{opt}(t)$ may be represented as a row vector that contains indexes corresponding to the users 240 . . . 250 contained in the optimal group for channel realization t. By representing the index of the optimal users as a random variable X the vector as in the following expression:

$$D_{opt} \triangleq [D_{opt}(1), D_{opt}(2), \ldots, D_{opt}(T)]$$  (16)

may contain samples of the random variable X.

In step 506, an estimate of the cumulative distribution function (CDF) $\hat{F}(X)$ of X may be produced based on samples from the optimal user index vector, X, that was determined in step 504 according to (16).

In step 508, a threshold, $\delta_{th} \in (0,1]$, may be selected. The reduced search range then be determined by the relationship as in the following expression:

$$L = \hat{F}^{-1}(\delta_{th}),$$  (17)

where $\hat{F}^{-1}(\cdot)$, is the inverse function of $\hat{F}(\cdot)$, for example:

$$X = \hat{F}^{-1}(\hat{F}(X)).$$

The threshold may be a measure of the likelihood that the a channel realization, evaluated among the full range of K users, will comprise the subset of L users.

In various embodiments of the invention, expression (17) may be implemented by tabulating the CDF $\hat{F}(X)$ in terms of the random variable comprising the index of optimal users X, and searching for a value of X that corresponds to $\delta_{th}$. The threshold $\delta_{th}$ may provide a measure of the statistical likelihood that the sum rate, computed among of subset of L users in the reduced searching range, may approach the optimal performance computed among the full group of K users.

While the exemplary embodiment of the invention illustrates a search range reduction scheme a system that utilizes a simple zero-forcing precoder, the invention is not so limited. Various embodiments of the invention may also be utilized with other more sophisticated precoders, for example a minimum mean squared error (MMSE) precoder, a Tomlinson-Harashima precoding (THP) precoder, or a sphere encoding precoder, for example.

Figure 6:
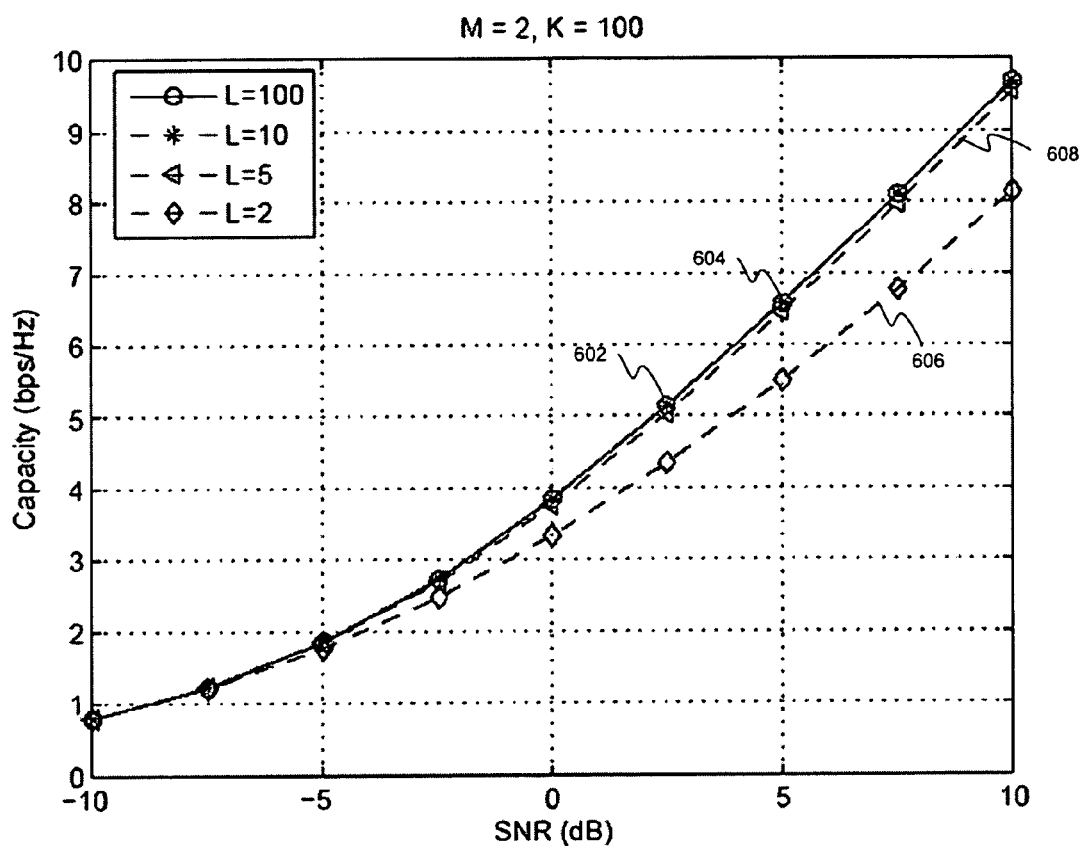
FIG. 6 is a chart illustrating exemplary capacity performance associated with various downlink transmission schemes, in accordance with an embodiment of the invention.

FIG. 6 is a chart illustrating exemplary capacity performance associated with various downlink transmission schemes, in accordance with an embodiment of the invention. The chart may be based on exemplary conditions in which the total number of users K=100 and the number of transmitting antenna at the base station M=2. Each user 240 may comprise a single receiving antenna 228. The channels for each channel realization may be generated to be flat Rayleigh faded channels. The transmit antennas 224 . . . 226 at the base station 200 may be placed at a sufficient distance that individual channels may experience fading that is independent of the fading in other channels. The modulation format utilized may be quaternary phase shift keying (QPSK).

Referring to FIG. 6, there is shown a graph illustrating the capacity performance of a downlink scheme in which the reduced range value L=100, 602, a graph illustrating the capacity performance of a downlink scheme in which the reduced range value L=10, 604, a graph illustrating the capacity performance of a downlink scheme in which the reduced range value L=5, 606, and a graph illustrating the capacity performance of a downlink scheme in which the reduced range value L=2, 608. In the graph 602, the reduced range may be equal to the full range, that is, the graph may illustrate the full search capacity performance. In the graph 604, the reduced search may search a subset comprising only the 10 strongest users. The capacity performance associated with the reduced range L=10 graph 604 may be substantially equal to the capacity performance of the full search graph 602.

The capacity performance comparison may represent a sum rate comparison. For a given search range L, the optimal brute-force search scheme may search over about $$\frac{L(L+1)}{2}$$

possible user groups. The search associated with graph 602 may comprise about 5,050 user groups. The search associated with the graph 604 may comprise about 55 users groups. The reduced search may represent a nearly 99% reduction in searched user groups in comparison to a full search. The capacity performance associated with the reduced range L=5 graph 606 may be approximately equal to the capacity performance of the full search graph 602. The search associated with the graph 606 may comprise about 15 users groups. The capacity performance associated with the reduced range L=2 graph 608 may be less than the capacity performance of the full search graph 602. The search associated with the graph 608 may comprise about 3 users groups. Various embodiments of the invention may reduce computational burden at the base station 200 in comparison to a conventional full search method, while achieving comparable capacity performance.

Figure 7:
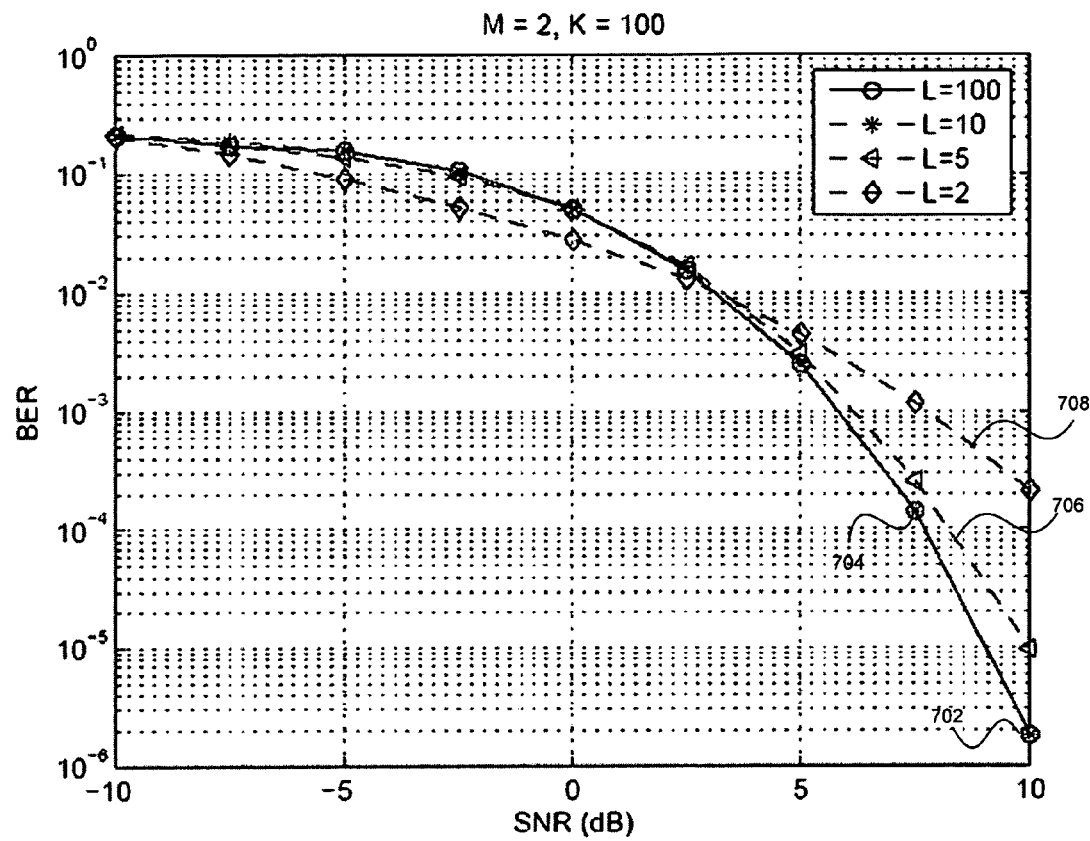
FIG. 7 is a chart illustrating exemplary bit error rate (BER) performance associated with various downlink transmission schemes, in accordance with an embodiment of the invention.

FIG. 7 is a chart illustrating exemplary bit error rate (BER) performance associated with various downlink transmission schemes, in accordance with an embodiment of the invention. The chart may be based on exemplary conditions in which the total number of users K=100 and the number of transmitting antenna at the base station M=2. Each user 240 may comprise a single receiving antenna 228. The channels for each channel realization may be generated to be flat Rayleigh faded channels. The transmit antennas 224 . . . 226 at the base station 200 may be placed at a sufficient distance that individual channels may experience fading that is independent of the fading in other channels. The modulation format utilized may be QPSK.

Referring to FIG. 7, there is shown a graph illustrating the BER performance of a downlink scheme in which the reduced range value L=100, 702, a graph illustrating the BER performance of a downlink scheme in which the reduced range value L=10, 704, a graph illustrating the BER performance of a downlink scheme in which the reduced range value L=5, 706, and a graph illustrating the BER performance of a downlink scheme in which the reduced range value L=2, 708. In the graph 702, the reduced range may be equal to the full range, that is, the graph may illustrate the full search capacity performance.

In the graph 704, the reduced search may search a subset comprising only the 10 strongest users. The BER performance associated with the reduced range L=10 graph 704 may be substantially equal to the BER performance of the full search graph 702. The BER performance associated with the reduced range L=5 graph 706 may be approximately equal to the capacity performance of the full search graph 702. The BER performance associated with the reduced range L=2 graph 708 may be less than the BER performance of the full search graph 702. Various embodiments of the invention may reduce computational burden at the base station 200 in comparison to a conventional full search method, while achieving comparable BER performance.

Furthermore, in a frequency division duplex (FDD) system where the base station 200 may obtain the CSI from the users 240 . . . 250 via a feedback link, the amount of feedback may also be reduced in various embodiments of the invention, when compared to conventional full search methods, because the base station 200 may only need full CSI knowledge from the L strongest users instead of all the K users. Full CSI knowledge may comprise channel gain information and channel direction information. In various embodiments of the invention, the base station 200 may need channel direction information from the L strongest users. For example, if a channel corresponding to each user may be characterized by a channel estimate $h_K$, $B_g$ bits may be utilized to quantize the channel gain $\|h_K\|^2$ and $B_v$ bits may be utilized to quantize channel direction $$\frac{h_K}{\|h_K\|^2}.$$

In this case, the total amount of feedback, in various embodiments of the invention may be given by the following expression:

$$B=K \cdot B_g+L \cdot B_v. \quad (18)$$

where the number of bits in, $B_v$ may be much larger than the number of bits in $B_g$ in many systems. Therefore, one aspect of the invention, which comprises reducing the range L in comparison to the full range K, may reduce the amount of feedback information that is processed by the base station 200. Table I gives a summary of the amount of feedback for various choices of L when $B_g=2$ bits and $B_v=6$ bits.

TABLE I

| Searching Range L | 100 | 10 | 5 | 2 |
|---|---|---|---|---|
| The Number of Possible User Groups | 5,050 | 55 | 15 | 3 |
| Feedback Amount B (bits) | 800 | 260 | 230 | 212 |

A system for communicating information in a communications system may comprise a range reduction processor 206 that determines a plurality of channel measurements corresponding to a plurality of signals. The range reduction processor 206 may compute a plurality of channel capacities based on the channel measurements corresponding to a subset of the plurality of signals having channel gain that is greater than a remaining portion of the plurality signals. The range reduction processor 206 may determine the channel gain associated with each of the plurality of signals based on the plurality of channel measurements. Each of the plurality of signals may be ranked based on a corresponding channel gain.

The range reduction processor 206 may select a subset of the plurality of signals based on the ranking and compute a number of instances in which each of the plurality of signals is one of the subset. A cumulative distribution function, for example, may be computed based on a plurality of the number of instances corresponding to a ranked plurality of signals. The range reduction processor 206 may select a threshold value based on the cumulative distribution function. The threshold may determine a number of signals that are to be included in the subset. An information transfer rate, or sum rate, associated with each of the selection portion of the plurality of signals, may be computed. At least one of the plurality of signals may correspond to at least one of a plurality mobile terminals, or users 240.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communications system, the method comprising:
    computing a plurality of channel measurements, each corresponding to one or more of a plurality of signals;
    identifying each of a plurality of users based on said plurality of signals;
    selecting a subset of said plurality of users based on said computed plurality of channel measurements;
    computing a plurality of channel capacities for said selected subset based on one or more of said computed plurality of channel measurements wherein channel capacities are not computed for each of said plurality of users that is not within said selected subset;
    selecting a group of users from said selected subset based on said computed plurality of channel capacities; and
    concurrently transmitting signals to said selected group of users.

2. The method according to claim 1, comprising computing a plurality of channel gain values for said plurality of users based on said computed plurality of channel measurements.

3. The method according to claim 2, comprising ranking said each of said plurality of users based on said computed plurality of channel gain values.

4. The method according to claim 3, comprising selecting said subset based on said ranking.

5. The method according to claim 1, comprising computing a number of instances in which each of said plurality of users is one of said selected subset.

6. The method according to claim 5, comprising computing a cumulative distribution function based on said computed number of instances for said each of said plurality of users.

7. The method according to claim 6, comprising selecting a threshold value based on said computed cumulative distribution function.

8. The method according to claim 7, comprising determining a number of users among said plurality of users that are selected for said subset based on said threshold.

9. The method according to claim 1, comprising computing an information transfer rate for each user among said selected subset based on a corresponding portion of said computed plurality of channel capacities.

10. The method according to claim 1, wherein said each of said plurality of users corresponds to a mobile terminal.

11. A system for communicating information in a communications system, the system comprising:
    one or more processors that are operable to compute a plurality of channel measurements, each corresponding to one or more of a plurality of signals;
    said one or more processors are operable to identify each of a plurality of users based on said plurality of signals;
    said one or more processors are operable to select a subset of said plurality of users based on said computed plurality of channel measurements;
    said one or more processors are operable to compute a plurality of channel capacities for said selected subset based on one or more of said computed plurality of channel measurements wherein channel capacities are not computed for each of said plurality of users that is not within said selected subset;
    said one or more processors are operable to select a group of users from said selected subset based on said computed plurality of channel capacities; and
    said one or more processors are operable to concurrently transmit signals to said selected group of users.

12. The system according to claim 11, wherein said one or more processors are operable to compute a plurality of channel gain values for said plurality of users based on said computed plurality of channel measurements.

13. The system according to claim 12, wherein said one or more processors are operable to rank said each of said plurality of users based on said computed plurality of channel gain values.

14. The system according to claim 13, wherein said one or more processors are operable to select said subset based on said ranking.

15. The system according to claim 11, wherein said one or more processors are operable to compute a number of instances in which each of said plurality of users is one of said selected subset.

16. The system according to claim 15, wherein said one or more processors are operable to compute a cumulative distribution function based on said computed number of instances for said each of said plurality of users.

17. The system according to claim 16, wherein said one or more processors are operable to select a threshold value based on said computed cumulative distribution function.

18. The system according to claim 17, wherein said one or more processors are operable to determine a number of users among said plurality of users that are selected for said subset based on said threshold.

19. The system according to claim 11, wherein said one or more processors are operable to compute an information transfer rate for each user among said selected subset based on a corresponding portion of said computed plurality of channel capacities.

20. The system according to claim 11, wherein said each of said plurality of users corresponds to a mobile terminal.

21. The system according to claim 11, wherein said one or more processors comprise a range reduction processor.

* * * * *